United States Patent [19]
Surugucchi et al.

[11] Patent Number: 6,098,119
[45] Date of Patent: Aug. 1, 2000

[54] APPARATUS AND METHOD THAT AUTOMATICALLY SCANS FOR AND CONFIGURES PREVIOUSLY NON-CONFIGURED DISK DRIVES IN ACCORDANCE WITH A PARTICULAR RAID LEVEL BASED ON THE NEEDED RAID LEVEL

[75] Inventors: Krishnakumar Rao Surugucchi, Fremont; Kailash, San Jose, both of Calif.

[73] Assignee: Mylex Corporation, Fremont, Calif.

[21] Appl. No.: 09/009,945

[22] Filed: Jan. 21, 1998

[51] Int. Cl.$^7$ .................................................. G06F 13/10
[52] U.S. Cl. ........................... 710/10; 710/16; 710/128; 711/114; 711/170; 714/5; 714/6; 714/7
[58] Field of Search ................... 710/10, 128, 10.16; 711/170, 114; 714/6, 5, 7; 360/15

[56] References Cited

U.S. PATENT DOCUMENTS

| | | | |
|---|---|---|---|
| 5,148,432 | 9/1992 | Gordon et al. .............................. | 714/7 |
| 5,276,558 | 1/1994 | Hanson ..................................... | 360/15 |
| 5,392,244 | 2/1995 | Baird et al. .............................. | 711/114 |
| 5,430,855 | 7/1995 | Walsh et al. .............................. | 710/10 |
| 5,471,640 | 11/1995 | McBride .................................... | 710/22 |
| 5,479,653 | 12/1995 | Jones ......................................... | 714/5 |
| 5,537,534 | 7/1996 | Nelson et al. .............................. | 714/6 |
| 5,542,065 | 7/1996 | Burkes et al. ........................... | 711/114 |
| 5,546,558 | 8/1996 | Burkes et al. ........................... | 711/114 |
| 5,572,661 | 11/1996 | Jacobson ..................................... | 714/5 |
| 5,574,851 | 11/1996 | Rathunde ................................ | 395/182.05 |
| 5,587,685 | 12/1996 | Johansson ................................ | 327/546 |
| 5,604,902 | 2/1997 | Burkes et al. ........................... | 707/206 |
| 5,615,352 | 3/1997 | Burkes et al. ........................... | 711/114 |
| 5,644,767 | 7/1997 | Rathunde ..................................... | 713/1 |
| 5,651,133 | 7/1997 | Burkes et al. ........................... | 711/114 |
| 5,657,468 | 8/1997 | Stallmo et al. .......................... | 395/441 |
| 5,659,704 | 8/1997 | Burkes et al. ........................... | 711/114 |
| 5,664,187 | 9/1997 | Burkes et al. ........................... | 707/205 |
| 5,666,512 | 9/1997 | Nelson et al. ........................... | 711/114 |
| 5,696,934 | 12/1997 | Jacobson et al. . | |
| 5,708,769 | 1/1998 | Stallmo ..................................... | 714/6 |
| 5,740,386 | 4/1998 | Miller et al. .............................. | 710/128 |
| 5,790,773 | 8/1998 | DeKoning et al. ......................... | 714/6 |
| 5,822,782 | 10/1998 | Humlicek et al. ....................... | 711/170 |
| 5,854,942 | 12/1998 | Penokie ..................................... | 710/10 |
| 5,882,782 | 10/1998 | Humlicek et al. ...................... | 710/170 |
| 5,950,230 | 9/1999 | Islam et al. .............................. | 711/156 |
| 5,960,169 | 9/1999 | Styczinski ................................ | 711/114 |
| 5,960,451 | 9/1999 | Voigt et al. .............................. | 711/114 |

FOREIGN PATENT DOCUMENTS

| | | |
|---|---|---|
| 0426185 A2 | 5/1991 | European Pat. Off. . |
| 0 485 110 A2 | 5/1992 | European Pat. Off. . |
| 0706113 A2 | 4/1996 | European Pat. Off. . |
| 076859 A1 | 4/1997 | European Pat. Off. . |
| 0 784 274 A2 | 7/1997 | European Pat. Off. . |
| 08335146 | 12/1996 | Japan . |
| WO 97/07461 | 2/1997 | WIPO . |

OTHER PUBLICATIONS

Patterson et al., "A Case for Redundant Arrays of Inexpensive Disks (RAID)," *University of California, Berkeley, CA, Computer Science Division Department of Electrical Engineering and Computer Sciences*, Abstract, pp. 1–24.

Mylex, DACCF Utilities Installation Guide and User Manual, Part No. 771953–D01, Copyright 1995.

Search Report dated Apr. 29, 1999, British Patent Office Application No. GB 9901346.8.

*Primary Examiner*—Thomas C. Lee
*Assistant Examiner*—Tammara Peyton
*Attorney, Agent, or Firm*—Flehr Hohbach Test Albritton & Herbert LLP

[57] ABSTRACT

The present invention pertains to an apparatus and method for automatically configuring disk drives connected to a RAID controller. The automatic configuration mechanism is able to generate a full configuration of the disk drives connected to a RAID controller both at system initialization or bootup and at runtime. The mechanism uses a robust criteria to configure the disk drives which allows the drives to be configured in accordance with one or more RAID levels and which considers any existing configurations. The automatic configuration mechanism is advantageous since it eliminates user interaction, time, and knowledge often required to configure disk drives connected to a RAID controller.

31 Claims, 11 Drawing Sheets

APPARATUS AND METHOD THAT AUTOMATICALLY SCANS FOR AND CONFIGURES PREVIOUSLY NON-CONFIGURED DISK DRIVES IN ACCORDANCE WITH A PARTICULAR RAID LEVEL BASED ON THE NEEDED RAID LEVEL

BRIEF DESCRIPTION OF THE INVENTION

The present invention relates generally to peripheral controllers. More particularly, the invention relates to the automatic configuration of Redundant Array of Independent Disks (AD) controllers.

BACKGROUND OF THE INVENTION

RAID is a technology used to improve the I/O performance and reliability of mass storage devices. Data is stored across multiple disks in order to provide immediate access to the data despite one or more disk failures. The RAID technology is typically associated with a taxomony of techniques, where each technique is referred to by a RAID level. There are six basic RAID levels, each having its own benefits and disadvantages. RAID level 2 uses non-standard disks and as such is not commercially feasible.

RAID level 0 employs "striping" where the data is broken into a number of stripes which are stored across the disks in the array. This technique provides higher performance in accessing the data but provides no redundancy which is needed for disk failures.

RAID level 1 employs "mirroring" where each unit of data is duplicated or "mirrored" onto another disk drive. Mirroring requires two or more disk drives. For read operations, this technique is advantageous since the read operations can be performed in parallel. A drawback with mirroring is that it achieves a storage efficiency of only 50%.

In RAID level 3, a data block is partitioned into stripes which are striped across a set of drives. A separate parity drive is used to store the parity bytes associated with the data block. The parity is used for data redundancy. Data can be regenerated when there is a single drive failure from the data on the remaining drives and the parity drive. This type of data management is advantageous since it requires less space than mirroring and only a single parity drive. In addition, the data is accessed in parallel from each drive which is beneficial for large file transfers. However, performance is poor for high I/O transaction applications since it requires access to each drive in the array.

In RAID level 4, an entire data block is written to a disk drive. Parity for each data block is stored on a single parity drive. Since each disk is accessed independently, this technique is beneficial for high I/O transaction applications. A drawback with this technique is the single parity disk which becomes a bottleneck since the single parity drive needs to be accessed for each write operation. This is especially burdensome when there are a number of small I/O operations scattered randomly across the disks in the array.

In RAID level 5, a data block is partitioned into stripes which are striped across the disk drives. Parity for the data blocks is distributed across the drives thereby reducing the bottleneck inherent to level 4 which stores the parity on a single disk drive. This technique offers fast throughput for small data files but performs poorly for large data files.

A typical data storage system can contain a number of disk storage devices that can be arranged in accordance with one or more RAID levels. A RAID controller is a device that is used to manage one or more arrays of RAID disk drives. The RAID controller is responsible for configuring the physical drives in a data storage system into logical drives where each logical drive is managed in accordance with one of the RAID levels.

RAID controllers are complex and difficult to configure. This is due in part to the numerous possible configurations that can be achieved, the knowledge required by a user to configure such a system, and the time consumed by a user in configuring the controller. In one such RAID controller configuration procedure, an automatic configuration feature is provided that attempts to alleviate the user's input by automatically configuring a number of devices at system initialization. However, this automatic configuration feature is very limited and only operates where all the physical disk drives are of the same physical size and where there are between 3 to 8 disk drives. In this case, the automatic configuration feature configures the disk drives as a single drive group defined as a RAID level 5 system drive with no spare drives. This configuration is limited providing no other alternate configurations.

Accordingly, there exists a need for an automatic RAID controller configuration mechanism that can accommodate various types of RAID level configurations and for disk drives having various physical dimensions.

SUMMARY OF THE INVENTION

The present invention pertains to an apparatus and method for automatically configuring disk drives connected to a RAID controller. The automatic configuration mechanism is able to generate a full configuration of the disk drives connected to a RAID controller both at system initialization or bootup and at runtime. The mechanism uses a robust criteria to configure the disk drives which allows the drives to be configured in accordance with one or more RAID levels and with various default settings that affect the operation of the disk array.

In a preferred embodiment, the automatic configuration mechanism includes a startup configuration procedure that provides the automatic configuration capability at system initialization and a runtime configuration procedure that automatically configures disk drives connected to the RAID controller at runtime. The startup configuration procedure generates a full configuration of the disk drives. The configuration specifies the logical drives that are formed and the associated operational characteristics for each logical drive which includes the RAID level, the capacity, as well as other information. The startup configuration procedure can accommodate previously existing configurations and partial configurations. In addition, the startup configuration procedure can configure unconfigured drives in accordance with a criteria that considers the existing configuration of the disk drives and which is able to select an appropriate RAID level suitable for optimizing the overall computer system's performance.

The runtime configuration procedure is used to configure disk drives connected to the RAID controller while the system is operational. The inserted disk drives can be part of an existing configuration or can be unconfigured. The runtime configuration procedure can incorporate the configured drives into the current configuration as well as configure the unconfigured drives. The unconfigured drives are configured in accordance with a criteria that uses the inserted disk drives to replace dead or failed drives, that adds the inserted disk drives to certain logical drives that can support the additional capacity at the defined RAID level, and that forms additional logical drives as needed.

The automatic configuration mechanism is advantageous since it eliminates user interaction required to configure disk drives connected to a RAID controller. In addition, the mechanism allows disk drives to be configured into one or more RAID levels in a manner that considers the current state of the disk drives and that optimizes the overall system performance. The mechanism is flexible performing the automatic configuration both at runtime and at system initialization.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1A:
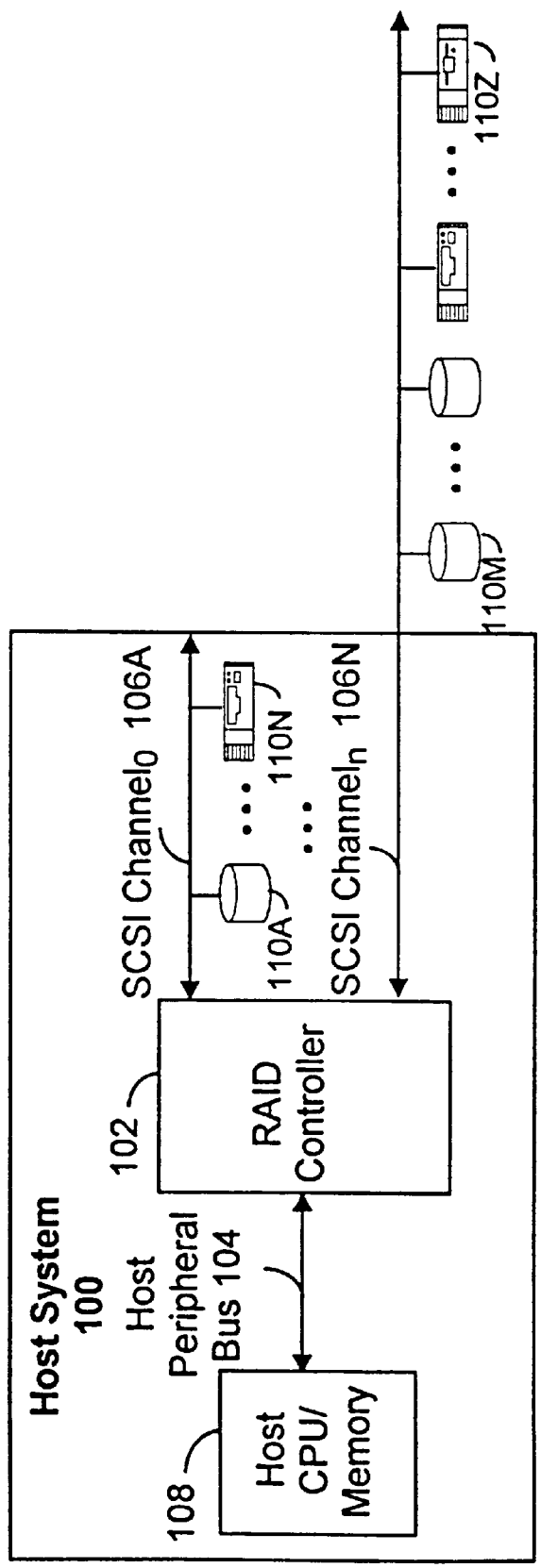
FIGS. 1A–1B illustrates a computer system in accordance with the preferred embodiments of the present invention.

FIG. 1A illustrates a host system 100 utilizing the RAID controller 102 in a first preferred embodiment of the present invention. There is shown the RAID controller 102 connected to a host peripheral bus 104 and one or more Small Computer System Interface (SCSI) channels 106A–106N. In a preferred embodiment, the RAID controller 102 can be any of the Mylex™ RAID controllers, such as but not limited to the DAC960 series of RAID controllers. The operation of SCSI channels is well known in the art and a more detailed description can be found in Ancot Corporation, Basics of SCSI, third edition, (1992–1996), which is hereby incorporated by reference.

The host peripheral bus 104 is connected to a host central processing unit (CPU) and memory 108. The host peripheral bus 104 can be any type of peripheral bus including but not limited the Peripheral Component Interconnect (PCI) bus, Industry Standard Architecture (ISA) bus, Extended Industry Standard Architecture (EISA) bus, Micro Channel Architecture, and the like. The host CPU and memory 108 includes an operating system (not shown) that interacts with the RAID controller 102.

Each SCSI channel 106 contains one or more peripheral devices 110A–110Z such as but not limited to disk drives, tape drives, various types of optical disk drives, printers, scanners, processors, communication devices, medium changers, and the like. A SCSI channel 106A can be used to access peripheral devices located within the host system 100 or a SCSI channel 106N can be used to access peripheral devices external to the host system 100.

Figure 1B:
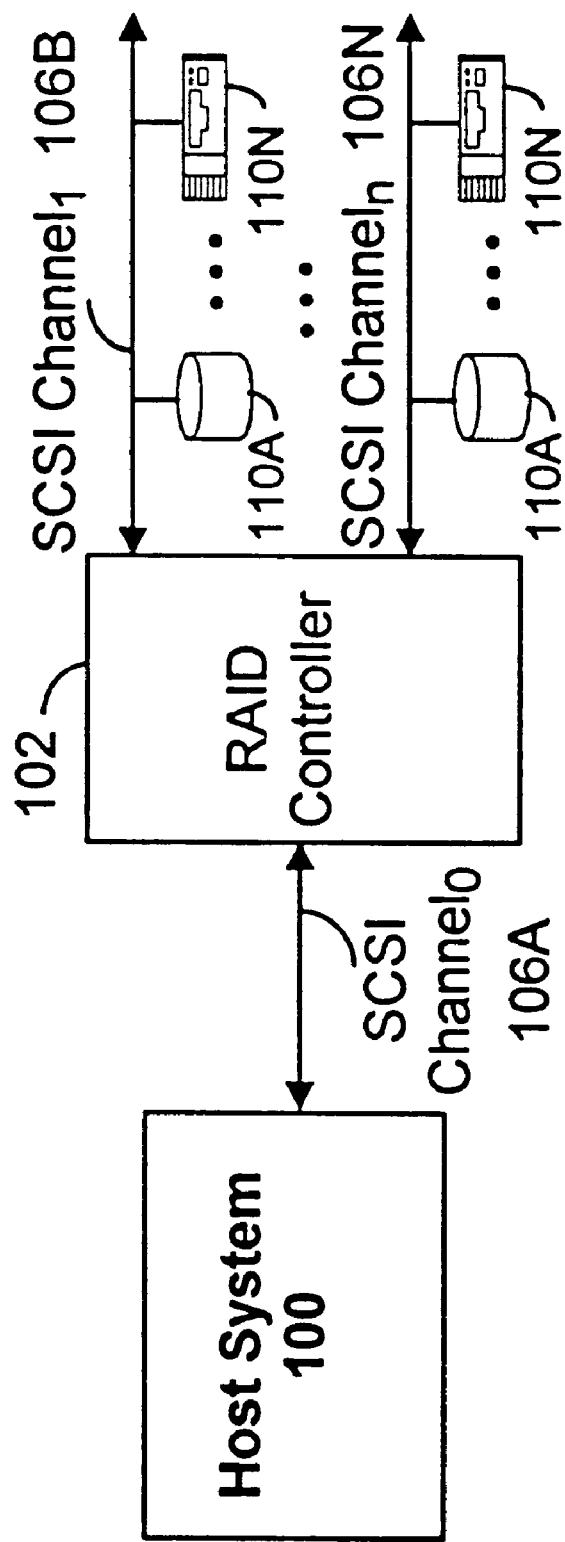

FIG. 1B illustrates a computer system in accordance with a second preferred embodiment of the present invention. In this embodiment, the RAID controller 102 is external to the host system 100. The RAID controller 102 is connected to the host system 100 through a SCSI channel 106A and is connected to one or more peripheral devices through one or more SCSI channels 106B–106N. The RAID controller 102 and the SCSI channels 106 are similar to what was described above with respect to FIG. 1A.

Figure 2:
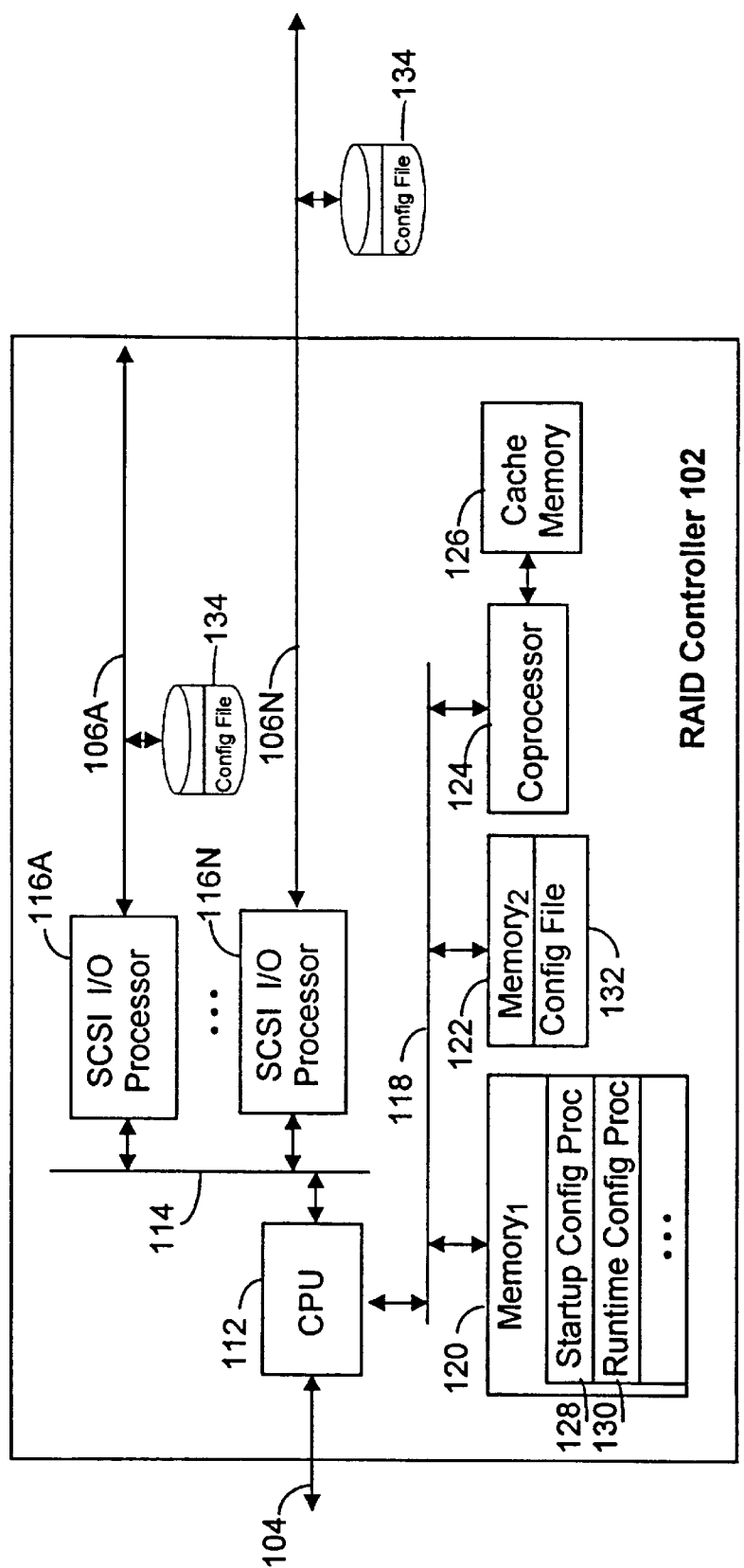
FIG. 2 illustrates a RAID controller in accordance with a preferred embodiment of the present invention.

FIG. 2 illustrates the components of the RAID controller 102. There is shown a CPU 112 connected to the host peripheral bus 104. The CPU 112 is also connected to a secondary peripheral bus 114 coupled to one or more SCSI I/O processors 116A–116N. A SCSI I/O processor 116 can be coupled to a SCSI channel 106A and acts as an interface between the secondary peripheral bus 114 and the SCSI channel 106. The CPU 112 is also coupled to a local bus 118 connected to a first memory device (memory$_1$) 120, a second memory device (memory$_2$) 122, and a coprocessor 124. The coprocessor 124 is coupled to an on-board cache memory 126 which is under the control of the coprocessor 124. The coprocessor 124 and cache memory 126 is used to retrieve data read to and written from the peripheral devices 110 as well as perform error correction code (ECC) encoding and decoding on data that is read to and from the peripheral devices 110. The cache memory 126 can employ either a write-through or write-back caching strategy.

In a preferred embodiment, the CPU 112 is a 32-bit Intel i960 RISC microprocessor, the first memory device 120 is a flash erasable/programmable read only memory (EPROM), the second memory device 122 is a non-volatile random access memory (NVRAM, the host peripheral bus 104 is a primary PCI bus, and the second peripheral bus 114 is a secondary PCI bus. In the first memory device 120, there can be stored a startup configuration procedure 128 and a runtime configuration procedure 130. The startup configuration procedure 128 is used to automatically configure the disk drives at system initialization or bootup which occurs before the operating system is installed. The runtime configuration procedure 128 is used to configure the disk drives while the operating system is operational. In the second memory device 122, there can be stored a configuration file 132 containing the current configuration of the RAID disk drives.

In addition, each physical disk drive associated with the RAID controller 102 includes a configuration file 134 that includes data indicating the configuration of the drive.

In an alternate embodiment, the second memory device 122 on the controller holds only configuration labels which identify the configuration files 134 on the physical disk drives, rather than holding the entire configuration information.

The foregoing description has described the computer system utilizing the technology of the present invention. It should be noted that the present invention is not constrained to the configuration described above and that other configurations can be utilized. Attention now turns to a brief overview of the terminology that will be used to describe a preferred embodiment of the present invention. This terminology is explained in the context of the manual configuration procedure.

Figure 3:
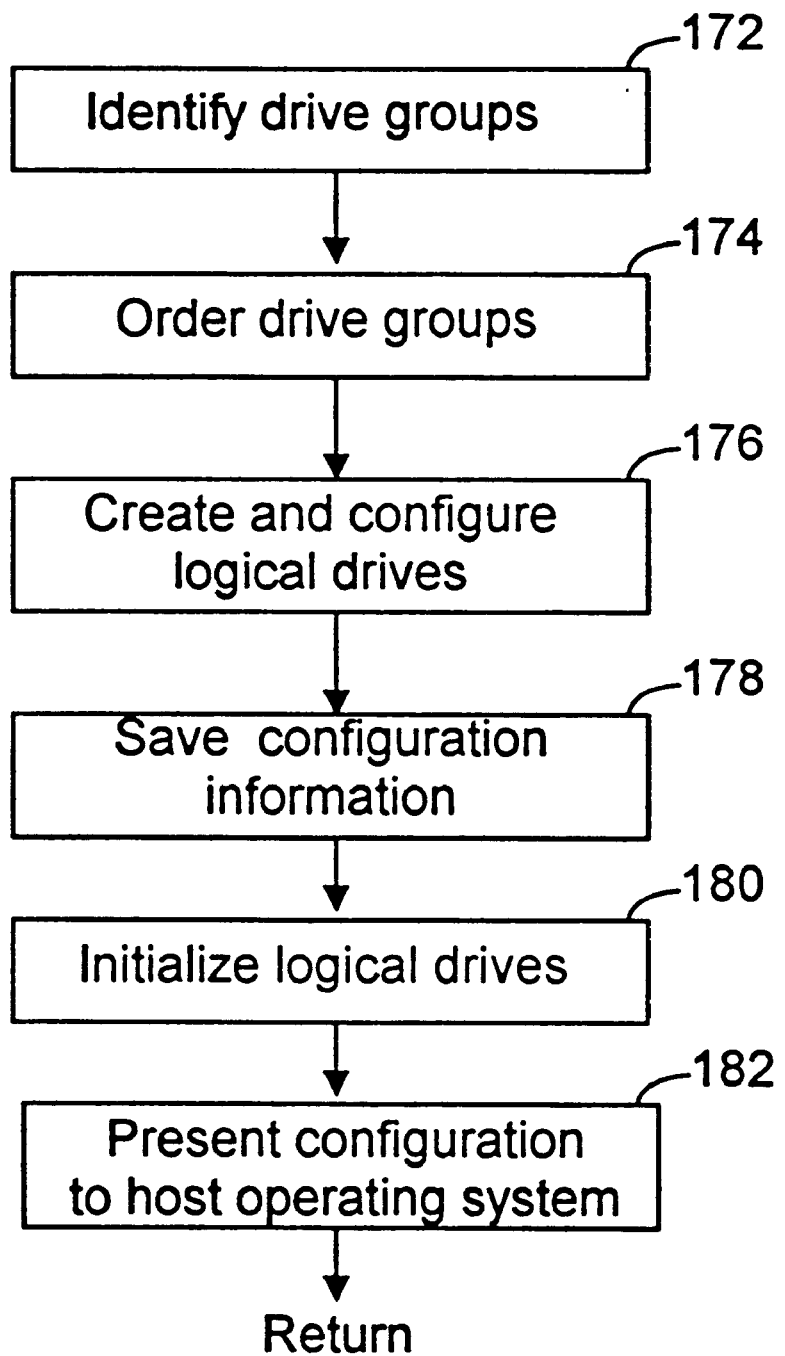
FIG. 3 is a flow chart illustrating the steps used to manually configure a set of disk drives.

The manual configuration procedures are used to create logical disk drives from an array of physical disk drives. Typically the configuration process is a manual procedure that is initiated by a user. FIG. 3 illustrates the steps used in the manual configuration process. First, a user identifies one or more drive groups (step 172), orders the drive groups (step 174), and creates and configures one or more logical drives in each drive group with a RAID level as well as other parameter settings (step 176). The configuration information is stored in each physical drive and in the RAID controller (step 178). The logical drives are then initialized (step 180) and the configuration is presented by the RAID controller 102 to the host operating system (step 182). These steps will be described in more detail below.

Figure 4:
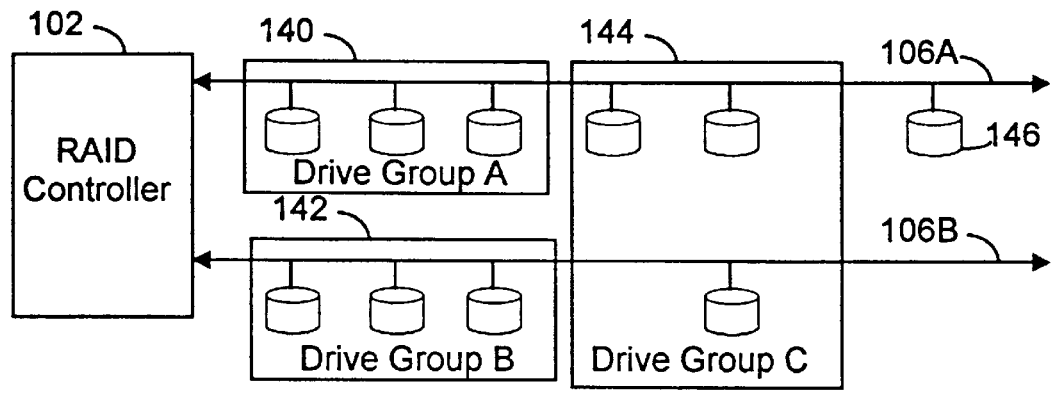
FIGS. 4–5 illustrate the process of forming and ordering drive groups from physical drives in a preferred embodiment of the present invention.

FIG. 4 illustrates a number of physical disk drives arranged in one or more drive groups 140, 142, 144 (step 172). The physical disk drives are connected to one of the SCSI channels 106. The physical disk drives can be arranged into one or more drive groups 140, 142, 144. A drive group 140, 142, 144 is used to create logical drives having a defined capacity, a RAID level, as well as other device settings. The capacity is based on the aggregate of the capacities of each of the disk drives in the drive group and depends on the RAID level. In a preferred embodiment, the RAID controller 102 can support up to eight drive groups. A drive group can include one to eight physical drives. Drives that are not included in any drive group are considered standby or hot spare drives. The standby drive is a redundant disk drive that is used when a disk drive fails.

As shown in FIG. 4, the disk drives are configured into three drive groups referred to as drive group A 140, drive group B 142, and drive group C 144 with one standby drive 146. Drive group A 140 contains three disk drives located on SCSI channel 106A, drive group B 142 includes three disk drives located on SCSI channel 106B, and drive group C 144 includes two disk drives situated on SCSI channel 106A and one disk drive situated on SCSI channel 106B. Disk drive 146 is considered the hot spare drive.

After all the disk groups have been identified, the drive groups are ordered (step 174). The drive groups are ordered with a sequential numeric ordering from 1 to n, where n is the highest order number. The ordering is used for certain operating system purposes and in particular to designate a primary logical drive that can serve as a boot drive. A boot drive is used to "boot-up" the physical drives in a configuration which is described in more detail below.

Figure 5:
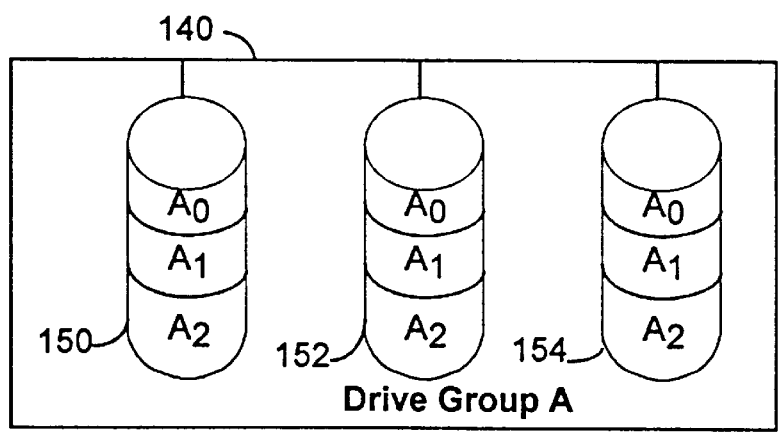

Next, logical drives in each drive group are created and configured (step 176). A logical or system drive is that portion of a drive group seen by the host operating system as a single logical device. There can be more than one logical drive associated with a particular drive group. A user creates a logical drive by indicating the portions of the drive group that will be part of a particular logical drive. For example, as shown in FIG. 5, drive group A includes three physical drives 150, 152, 154 and three logical drives $A_0$, $A_1$, and $A_2$. Logical drive $A_0$ spans across a designated portion of each physical drive 150, 152, and 154 in drive group A. Similarly, logical drive $A_1$ and $A_2$ each span across a designated portion of each physical drive 150, 152, and 154 in drive group A Each logical drive within a drive group is ordered. This order is derived from the manner in which the logical drives are created. The logical drives are created based on the order of their respective drive groups. For instance, the first logical drive created in the first drive group is considered the first logical drive, the second logical drive created in the first drive group is considered the second logical drive, and so on. As noted above, the order is used to define the logical drive that serves as the boot drive. A boot drive is used at system initialization to boot up the physical drives in the configuration. The first logical drive (i.e., logical drives) is considered the boot drive. In addition, the order is used to add disk capacity which is discussed in more detail below. As shown in FIG. 5, logical $A_0$ is considered the first logical drive or boot drive of drive group A, logical drive $A_1$ is considered the second logical drive, and logical drive $A_3$ is considered the third logical drive.

Each logical drive is configured by defining a capacity, a cache write policy, and a RAID level. The capacity of a logical drive includes any portion of a drive group up to the total capacity of that drive group.

The RAID controller 102 has a cache memory 126 that is used to increase the performance of data retrieval and storage operations. The cache memory 126 can be operated in a write-back or write-through mode. In a write-back mode, write data is temporarily stored in the cache 126 and written out to disk at a subsequent time. An advantage of this mode is that it increases the controller's performance. The RAID controller 102 notifies the operating system that the write operation succeeded although the write data has not been stored on the disk. However, in the event of a system crash or power failure, data in the cache 126 is lost unless a battery backup is used.

In write-through mode, write data is written from the cache 126 to the disk before a completion status is returned to the operating system. This mode is more secure since the data is not lost in the event of a power failure. However, the write-through operation lowers the performance of the controller 102 in many environments.

Each logical drive has a RAID level which is based on the number of drives in the drive group in which it is created. In a preferred embodiment, the following RAID levels are supported:

TABLE I

| RAID LEVEL or JBOD | DESCRIPTION |
| --- | --- |
| RAID 0 | Striping. Requires a minimum of 2 drives and a maximum of 8 drives. This RAID level does not support redundancy. |
| RAID 1 | Mirroring. Requires 2 drives. This RAID level supports redundancy. |
| RAID 3 | Requires a minimum of 3 drives and a maximum of 8 drives. This RAID level supports redundancy. |
| RAID 5 | Requires a minimum of 3 drives and a maximum of 8 drives. This RAID level supports redundancy. |
| RAID 0+1 | Combination of RAID 0 (striping) and RAID 1 (mirroring). Requires a minimum of 3 drives and a maximum of 8 drives. This RAID level supports redundancy. |
| Just a Bunch of Disks (JBOD) | Each drive functions independently of one another. No redundancy is supported. |

Figure 6:
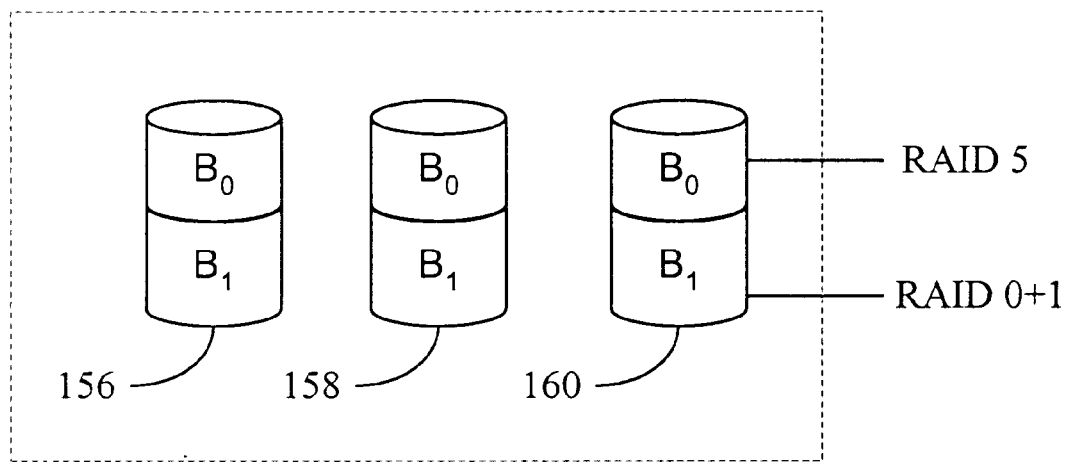
FIG. 6 illustrates an exemplary assignment of RAID levels to a set of logical drives in accordance with a preferred embodiment of the present invention.

FIG. 6 illustrates an exemplary assignment of the RAID levels for a particular drive group, drive group B. In this example, logical drive Bo spans across three physical drives 156, 158, 160 and logical drive $B_1$ spans across the same physical drives 156, 158, 160. Logical drive $B_0$ is assigned RAID level 5 and logical drive $B_1$ is assigned RAID level 0+1.

Once the configuration procedure is completed, the configuration for each drive group is stored in each physical drive in a configuration file 134 preferably located in the last 64K bytes of the drive (step 178). The logical drives are then initialized (step 180) and the RAID controller 102 presents the configuration to the host operating system (step 182).

The foregoing description has described the steps that can be used by a user to manually configure the disk drives connected to a RAID controller and introduces the terminology used in a preferred embodiment of the present invention. Attention now turns to the methods and procedures that are used to automatically configure the disk drives connected to a RAID controller.

There are two procedures that are used to automatically configure the disk drives 110 connected to a RAID controller 102. A startup configuration procedure 128 is used when the controller 102 is powered up or started before the operating system is operational. A runtime configuration procedure 130 is used to alter the configuration at runtime when additional disk drives are connected to the controller 102. At runtime, the RAID controller 102 is operational and servicing the I/O activity.

Figure 7:
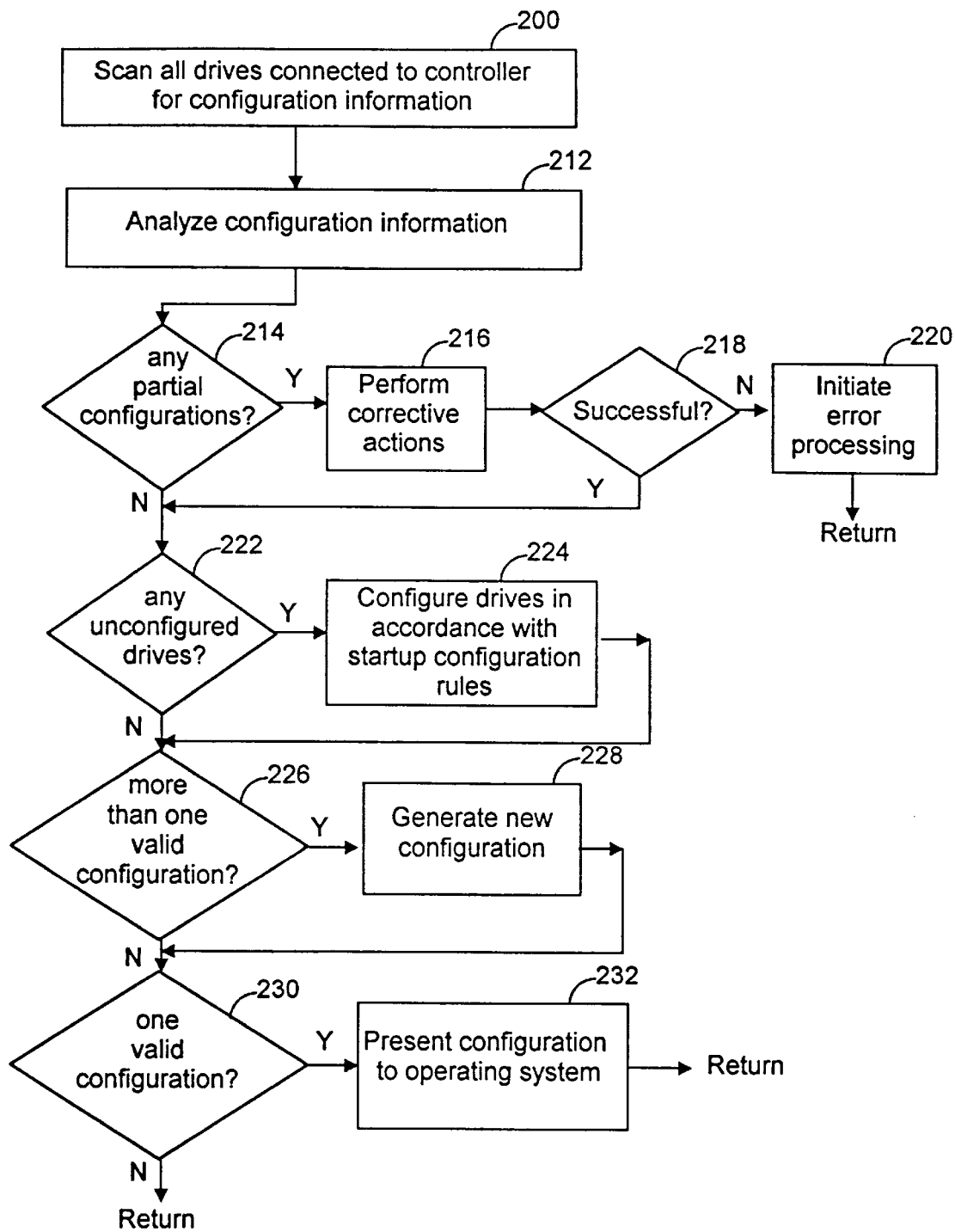
FIG. 7 is a flow chart illustrating the steps used in the startup configuration procedure in a preferred embodiment of the present invention.

FIG. 7 illustrates the steps used by the startup configuration procedure 128 to create a configuration for the disk drives connected to the controller 102. At power-up, the controller 102 scans all the devices 110 connected to it in order to obtain the physical capacity of a disk drive and to obtain the configuration data from the disk drive (step 200).

Figure 8:
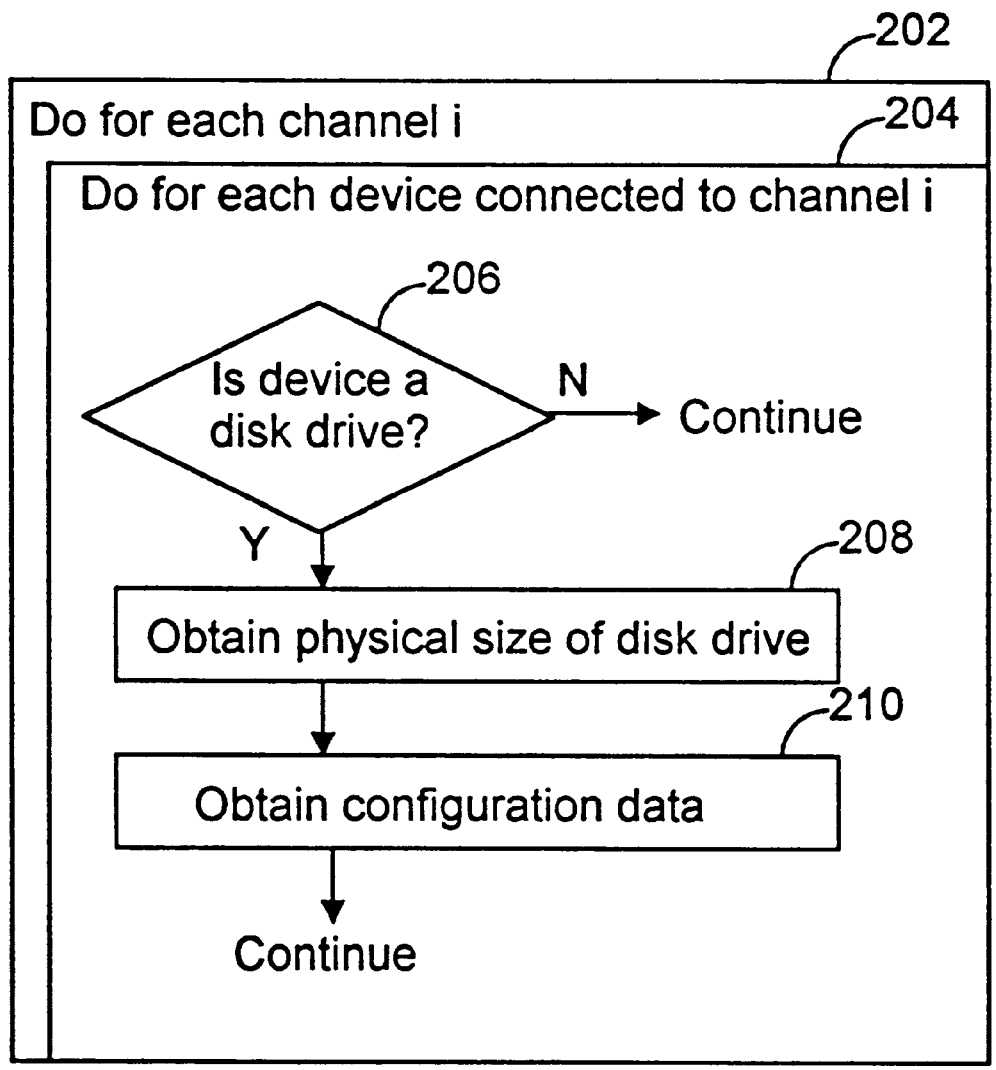
FIG. 8 is a flow chart illustrating the steps used to scan the physical devices connected to the RAID controller in a preferred embodiment of the present invention.

FIG. 8 illustrates this step (step 200) in further detail. The startup configuration procedure 128 scans each SCSI channel 106 (step 202) and each device 110 connected to the SCSI channel 106 (step 204). In a preferred embodiment, the startup configuration procedure 128 can issue the SCSI command TEST READY UNIT to determine if a peripheral connected to a SCSI channel 106 is powered up and operational. The startup configuration procedure 128 can also issue an INQUIRY command to determine the type of the peripheral device 110. If the device 110 is not a disk drive (step 206-N), then the startup configuration procedure 128 continues onto the next device 110. Otherwise (step 206-Y), the startup configuration procedure 128 obtains the capacity of the disk drive (step 208). This can be accomplished by the startup configuration procedure 128 issuing a READ CAPACITY command to the device. The READ CAPACITY command returns the maximum logical block address (LBA) for a disk drive which serves as an indicator of the capacity of the device 110.

Next, the startup configuration procedure 128 attempts to read the configuration file 134 stored in the disk drive (step 210). As noted above, the configuration file 134 is preferably located at the last 64K block on the disk drive. A configuration file 134 is present if the disk has been previously configured. Otherwise, the configuration file 134 will not exist. The configuration file 134 contains configuration information such as the drive group identifier, the logical drive identifier, the RAID level, as well as other information.

The startup configuration procedure 128 repeats steps 202–210 for each disk drive 110 located on each channel 106 that is connected to the RAID controller 102.

Referring back to FIG. 7, the startup configuration procedure 128 then analyzes the configuration information (step 212). The startup configuration procedure 128 uses the configuration information to determine the validity of each configuration and to determine which devices have not been configured.

A complete configuration is one where all the physical drives identified in the configuration are connected to the controller 102. A partial configuration is one where some of the physical drives identified in the configuration are not connected to the controller 102. A valid configuration is one that is either a complete configuration or a partial configuration where the logical drives are at least in the degraded mode. Degraded mode refers to the situation where the following two conditions are met. Firstly, the logical drives are configured with redundancy (i.e., RAID level 1, 3, 5, or 0+1) and secondly, a physical drive is dead or not operational but the logical drive can still operate without any data loss. In degraded mode, the drive group is functioning and all data is available, but the array cannot sustain a further drive failure without potential data loss.

After analyzing the configuration information, the startup configuration procedure 128 determines whether there are any partial configurations present (step 214). As noted above, a partial configuration is one where some of the physical drives identified in the configuration are not connected to the controller 102. If so (step 214-Y), the startup configuration procedure 128 performs corrective actions to configure the drive group as a valid configuration (step 216). The procedure 128 will attempt to place the logical drives in the degraded mode (step 216).

When the corrective action cannot be performed (step 218-N), the startup configuration procedure 128 terminates processing and an appropriate error message can be displayed to the user (step 220). In the case where the corrective action is successful (step 218-Y), the startup configuration procedure 128 continues processing.

The startup configuration procedure 128 then determines whether there are any unconfigured drives (step 222). An unconfigured drive is one that does not have a configuration file 134 associated with it. If there are any unconfigured drives, the startup configuration procedure 128 configures the drives with the following configurable default parameter settings (step 224):

Stripe size: The stripe size is the size of the amount of data written on one drive before moving to the next drive. The stripe size is used to tune the controller performance for a specific environment or application. Typically, a smaller stripe size provides better performance for random I/O and a larger stripe size provides better performance for sequential transfers.

Cache line size: The cache line size represents the size of the data that is read or written. The cache line size is based on the stripe size.

SCSI transfer rate: The SCSI transfer rate sets the maximum transfer rate for each drive channel.

Spin-up option: The spin-up option controls how the SCSI drives in the array are started. There are two spin-up modes that may be selected: Automatic and On Power. The Automatic option causes the controller to spin-up all connected drives, two-at-a-time at six second intervals, until every drive in the array is spinning. The On Power option assumes that all drives are already spinning.

Controller read ahead: The controller read ahead option allows the controller to read into the cache a full cache line of data at a time. When this option is enabled, the percentage of cache hits is improved.

Automatic add capacity: This option automatically adds capacity to a logical drive.

In addition, the startup configuration procedure 128 associates a RAID level with the unconfigured drives based on the following parameter settings and the number of inserted unconfigured drives (step 224). The parameter settings that are used to affect the determination of the RAID level are as follows:

Redundancy: This option specifies whether or not data redundancy is required.

Redundancy method: This options specifies one of the two redundancy methods: mirroring or parity. Mirroring refers to the 100% duplication of data on one disk drive to another disk drive. Parity or rotated XOR redundancy refers to a method of providing complete data redundancy while requiring only a fraction of the storage capacity of mirroring. For example, in a system configured under RAID 5, all data and parity blocks are divided between the drives in such a way that if any single drive is removed or fails, the data on it can be reconstructed using the data on the remaining drives.

Spare disposition: The controller allows for the replacement of failed hard disk drives without the interruption of system service. A hot spare is a standby drive that is used in the event of a disk failure to rebuild the data on a failed disk.

A RAID level is assigned to the unconfigured drives based on the aforementioned parameter settings and the number of inserted unconfigured drives in accordance with the following rules which are illustrated in Table II below:

(1) If the number of unconfigured drives=1, then the unconfigured drive is a JBOD.

(2) If redundancy is not needed, the RAID level is set to RAID 0.

(3) If redundancy is not needed and the number of drives=2, then the RAID level is set to RAID 1.

(4) If redundancy is not needed, the number of drives>=3, and a spare is needed, then the largest drive is designated as a spare drive and the number of drives is decremented by 1.

(5) If there are only two unconfigured drives at this point, then the RAID level is set to RAID 1.

(6) If the redundancy method is mirroring then set the RAID level to 0+1.

(7) If the redundancy method is not mirroring, then set the RAID level to 5.

TABLE II

| Conditions | | | | Results | | |
|---|---|---|---|---|---|---|
| No.of Drives Installed, n | Redundancy Needed | Redundancy Method | Spare Needed | RAID Level/ JBOD | Spare Created | No.of Active Drives |
| 1 | X | X | X | JBOD | No | 1 |
| X | No | X | X | 0 | No | X |
| 2 | Yes | X | X | 1 | No | 2 |
| 3 | Yes | X | Yes | 1 | Yes | 2 |
| 3 | Yes | Mirroring | No | 0 + 1 | No | 3 |
| 3 | Yes | Parity | No | 5 | No | 3 |
| n > 3 | Yes | Mirroring | No | 0 + 1 | No | n |
| n > 3 | Yes | Parity | No | 5 | No | n |
| n > 3 | Yes | Mirroring | Yes | 0 + 1 | Yes | n − 1 |
| n > 3 | Yes | Parity | Yes | 5 | Yes | n − 1 |

Once the unconfigured drives are configured, their configuration is stored in each physical drive and the startup configuration procedure 128 continues processing (step 224).

The startup configuration procedure 128 then determines whether there is more than one valid configuration (step 226). In this case (step 226-Y), a new configuration is generated which is an aggregation of all the valid configurations and each logical drive is assigned a logical drive order with respect to the aggregated configuration (step 228). An existing logical drive order may be associated with each valid configuration thereby requiring the generation of a new logical drive order for the aggregated configuration.

Figure 9:
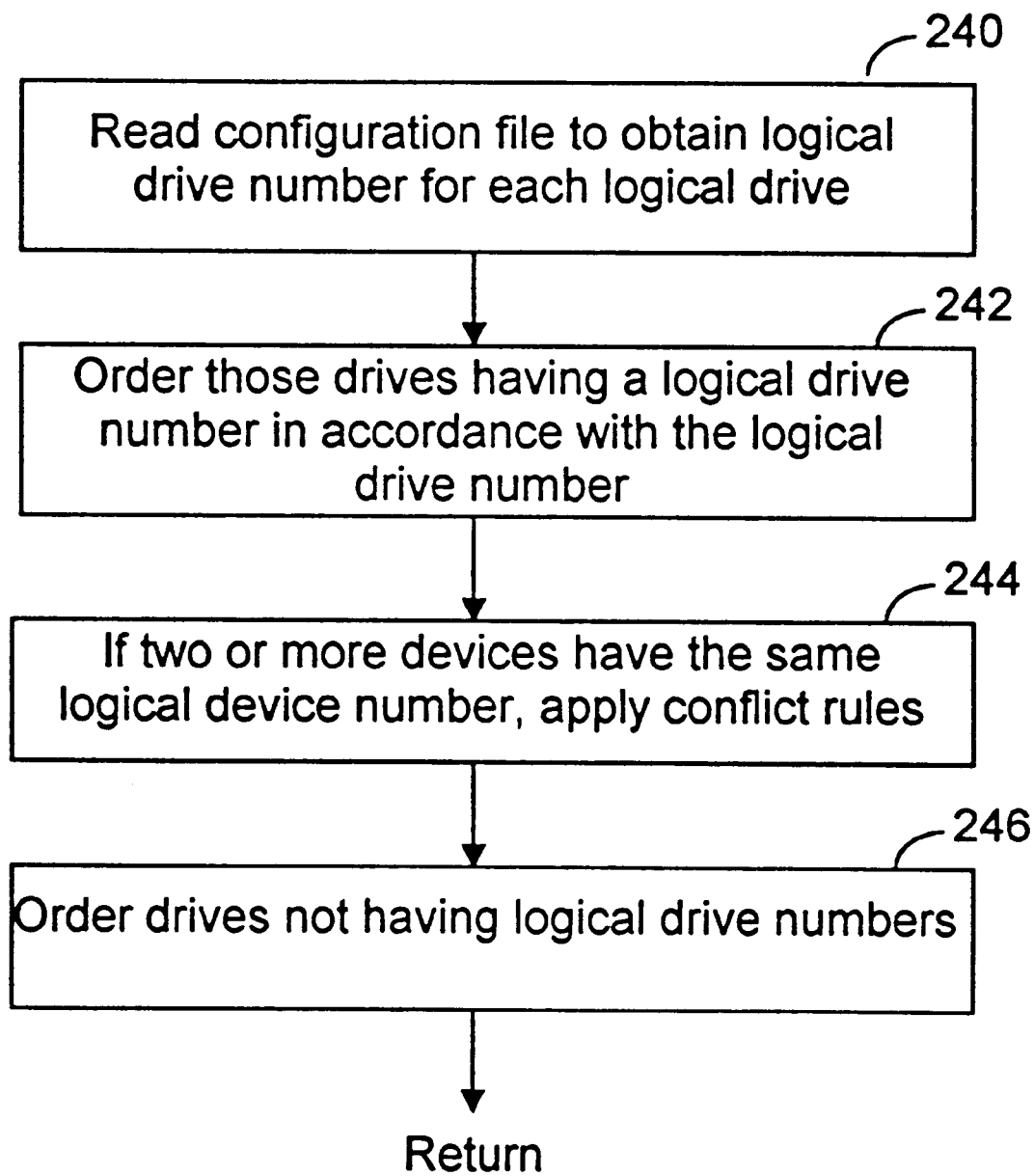
FIG. 9 is a flow chart illustrating the logical drive order rules of a preferred embodiment of the present invention.

Referring to FIG. 9, the startup configuration procedure 128 reads the configuration file 132 associated with each logical drive (step 240). In some instances, a single configuration file 132 can be associated with several logical drives. This is due to the fact that there is a single configuration file 132 for each physical drive and several logical drives can be associated with a particular physical drive. The configuration file 132 will include a logical drive number representing the drive's logical drive order. The logical drive numbers found in the configuration files 132 will be used as the logical drive order for the combined configuration (step 242).

However, there may be two or more logical drives with the same logical drive number. In this case, the following conflict rules are used in order to ascertain which of the conflicting logical drives takes a higher precedence (step 244). For example, if there are two drives, each numbered as the first logical drive, one will be considered the first logical drive and the other is considered the second logical drive.

First, the controller's configuration file 132 is searched for the configuration label which is a unique identifier for each configuration. If this label matches the label associated with one of the conflicting logical drives, the logical drive indicated by the label takes precedence over the other conflicting logical drive.

In the case where the controller's configuration file 132 does not have an identifier matching either of the conflicting logical drives, logical order precedence is given to the logical drive closest to the first SCSI channel and the first SCSI device i.e., closest to SCSI channel 0, and target identifier 0). For example, if the first conflicting drive is located at SCSI channel 1 and has target identifier 3 and a second conflicting drive is located at SCSI channel 0 and has target identifier 4, the second conflicting drive is given precedence since it is closest to SCSI channel 0, target identifier 0.

Referring back to FIG. 9, the startup configuration procedure 128 then determines whether there is one valid configuration (step 230). In this case (step 230-Y), the full configuration is presented to host operating system (step 232).

The foregoing description has described the steps that can be used to automatically configure the disk drives connected to a RAID controller at system initialization. Attention now turns to the manner in which disk drives are automatically configured during the run-time operation of the controller.

While the system is operational, a user can connect one or more physical drives to a SCSI channel 106. The runtime configuration procedure 130 is used to detect the added drives and to add the drives to the present configuration A user can insert one or more physical drives which can be preconfigured or unconfigured. Based on the number of physical drives that are inserted and the present configuration of the disk drives, the runtime configuration procedure 130 can use the physical drives to replace failed drives, to expand the capacity of existing logical drives, and to form new logical drives.

Figure 10:
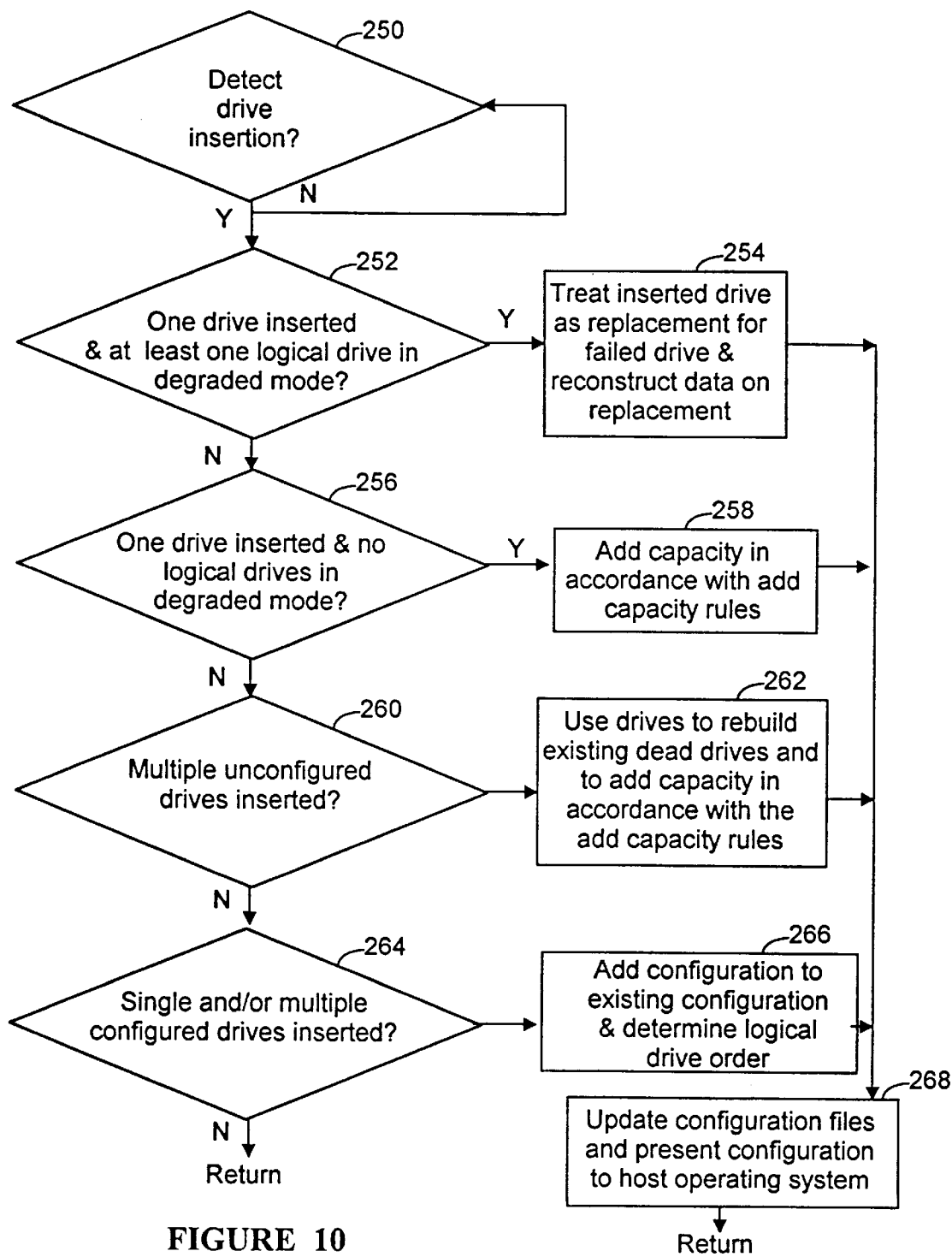
FIG. 10 is a flow chart illustrating the steps used in the runtime configuration procedure in a preferred embodiment of the present invention.

Referring to FIG. 10, a user can insert an additional drive within an insertion delay time which preferably is one minute. Multiple drives can be inserted one at a time and the time between subsequent insertions is less than or equal to the insertion delay. The controller 102 will take notice of the insertions at the end of the insertion delay (step 250-Y). The controller 102 receives an interrupt from a subsystem indicating that additional drives have been inserted to a SCSI channel 106. In an alternate embodiment where the subsystem does not support automatic detection of drive insertions, a user can utilize a utility to perform the notification to the controller 102.

If only one drive is inserted and there is at least one logical drive in the degraded mode (step 252-Y), the inserted drive is used as a replacement for the failed physical drive and the data from the failed drive is reconstructed onto the inserted drive (step 254). As noted above, degraded mode refers to the case where there exists one or more dead or non-operational disk drives.

Figure 11:
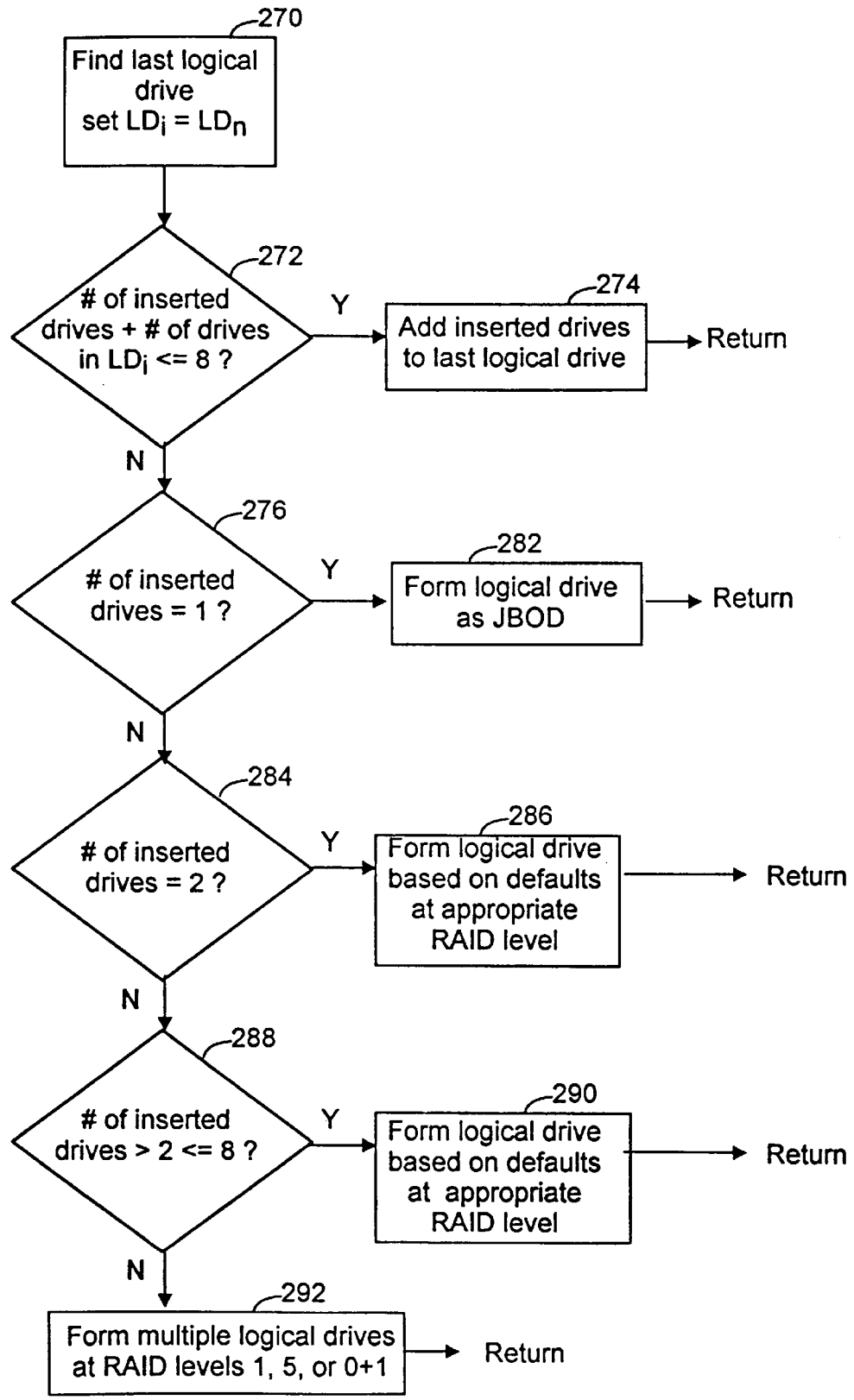
FIG. 11 is a flow chart illustrating the steps used to add capacity in accordance with a preferred embodiment of the present invention.

If only one drive is inserted and there are no logical drives in the degraded mode (step 256-Y), the inserted drive is used to add capacity to the system in accordance with the add capacity rules shown in FIG. 11.

Briefly, an attempt is made to add the inserted drives to the last logical drive. In other words, the capacity of the inserted drives is added to the logical drive associated with the highest numeric order which can also be referred to as the last logical drive. However, there is a limit to the number of physical drives that can be grouped into a drive group and associated with a particular RAID level. If the sum of the physical drives in the last logical drive and the number of inserted drives is less than or equal to 8, the inserted drives are added to the last logical drive. The capacity of the inserted drives is added to the capacity of the last logical drive.

If the sum of the physical drives in the last logical drive and the number of inserted drives exceeds 8, the inserted drives will be added so as to maximize the number of logical drives having redundancy. Redundancy is seen at RAID levels 1, 5 and 0+1. The runtime configuration procedure 130 will attempt to add the inserted drive to the last logical drive. If the last logical drive cannot accommodate all the inserted drives due to the constraints of the corresponding RAID level, the procedure 130 will add as many as possible and form a new logical drive with the remaining inserted drives. For example, if there are 6 drives in the last logical drive and 3 inserted disk drives, only one of the inserted disk drives is added to the last logical drive and a new logical drive is formed with the remaining two drives. The new logical drive is configured with a RAID level 1 supporting redundancy.

Referring to FIG. 11, the runtime configuration procedure 130 starts with the last logical drive ($LD_i=LD_n$) (step 270) and determines whether all the inserted drives can be added to the last logical drive (step 272). If the sum of the number of inserted drives and the number of drives in the last logical drive is less than or equal to 8 (step 272-Y), the inserted drives are added to the capacity of the last logical drive (step 274). The number 8 represents a threshold that is used in an embodiment of the present invention. However, it should be noted that the present invention is not constrained to this particular value and that others can be used.

Otherwise (step 272-N), if only one drive was inserted (step 276-Y), the runtime configuration procedure 130 forms a new logical drive as a JBOD (step 282).

If the number of inserted drives is two (step 284-Y), a new logical drive and drive group is formed with the inserted drives in accordance with the default parameter settings as described above in Table II (step 286).

If the number of inserted drives is between 3 and 8 (step 288-Y), a new logical drive and drive group is formed with the inserted drives in accordance with the default parameter settings as described above in Table II (step 290).

If the number of inserted drives exceeds eight (step 288-N), one or more logical drives and/or drive groups are formed at RAID levels 1, 5, or 0+1 based on the default parameter settings as described above in Table II (step 292).

Referring back to FIG. 10, the runtime configuration procedure 130 then updates the configuration in the configuration file 134 associated with the physical drive (step 268). At a later time, the controller 102 presents the new configuration to the host operating system (step 268).

If multiple unconfigured physical drives are inserted (step 260-Y), the runtime configuration procedure 130 allocates the drives as follows. First, the physical drives are used to rebuild any existing dead drives (step 262). If there are no dead drives or there are remaining inserted drives after the dead drives have been replaced, the runtime configuration procedure 130 uses the inserted drives to add capacity to existing logical drives in accordance with the above mentioned add capacity rules shown in FIG. 11 (step 258).

The runtime configuration procedure 130 then updates the configuration in the configuration file 134 associated with the physical drive (step 268). At a later time, the controller 102 presents the new configuration to the host operating system (step 268).

In the case where there are single and/or multiple configured drives inserted into the controller 102 (step 264-Y), the configuration of the inserted drives is combined with the existing configuration and the logical drive order is determined as described above with respect to FIG. 9 (step 266). The runtime configuration procedure 130 then updates the configuration in the configuration file 134 associated with the physical drive (step 268). At a later time, the controller 102 presents the new configuration to the host operating system (step 268).

The foregoing description has described an automatic configuration apparatus nd procedures which are used to configure the disk drives connected to a RAID controller. The configuration procedures can automatically configure a group of disks to operate at various RAID levels both at runtime and a system initialization. The automatic configuration apparatus and procedures are advantageous since they eliminate user intervention, knowledge, and time required for configuring the controller.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

We claim:

1. A computer-implemented method for automatically configuring disk drives connected to a controller, the method comprising the steps of:

scanning, by the controller, the disk drives connected to the controller;

finding, by the controller, one or more unconfigured disk drives from among the connected disk drives;

preparing, by the controller, a configuration for the unconfigured disk drives in accordance with one of a plurality of RAID levels, including:

(i) associating with each unconfigured disk drive one or more parameter settings; and (ii) configuring the unconfigured disk drives with a particular RAID level based on the number of unconfigured disk drives and the parameter settings, where the particular RAID level established for the unconfigured disk drives after the configuring may be different from the RAID level before the configuring of other of the connected disk drives; and storing, by the controller, the configuration with the controller.

2. The method of claim 1, wherein said step of configuring the unconfigured disk drives with the particular RAID level based on the number of unconfigured disk drives and the parameter settings is automatically performed without user intervention and further comprises a step of choosing said particular configuration based on predetermined rules specifying a RAID configuration as a function of a number of drives, redundancy needed, and redundancy method.

3. The method of claim 1, wherein the one or more parameter settings are selected from a group consisting of whether redundancy is needed or not needed by the disk drives, a redundancy method, and spare disk disposition.

4. The method of claim 1, wherein said step of preparing a configuration for the unconfigured disk drives is performed automatically, by said controller, based on predetermined rules stored in said controller including:

when only one unconfigured disk drive is found, configuring the unconfigured disk drive as a single drive (JBOD);

when the unconfigured disk drives are associated with a parameter setting indicating no redundancy, configuring the unconfigured disk drives in accordance with a RAID level 0;

when the unconfigured disk drives are associated with a parameter setting indicating mirroring, configuring the unconfigured disk drives in accordance with a RAID level of 0+1; and when the unconfigured disk drives are associated with a parameter setting indicating that mirroring is not required, configuring the unconfigured disk drives in accordance with RAID level of 5.

5. A computer-implemented method for automatically configuring disk drives connected to a controller, the method comprising the steps of:

scanning the disk drives connected to the controller;

finding one or more unconfigured disk drives;

preparing a configuration for the unconfigured disk drives in accordance with one of a plurality of RAID levels, such that (a) when only one unconfigured disk drive is found, configuring the unconfigured disk drive as a single drive (JBOD), (b) when the unconfigured disk drives are associated with a parameter setting indicating no redundancy, configuring the unconfigured disk drives in accordance with a RAID level 0, (c) when the unconfigured disk drives are associated with a parameter setting indicating mirroring, configuring the unconfigured disk drives in accordance with a RAID level of 0+1, (d) when the unconfigured disk drives are associated with a parameter setting indicating that mirroring is not required, configuring the unconfigured disk drives in accordance with RAID level of 5, and (e) when the unconfigured disk drives are associated with a parameter setting indicating that a spare disk drive is required, selecting a largest unconfigured disk drive as the spare disk drive, decrementing a number of unconfigured disk drives by the spare disk drive, and configuring the unconfigured disk drives with a RAID level that supports the number of unconfigured disk drives in accordance with the parameter settings; and storing the configuration with the controller.

6. The method of claim 1, after said configuring step and before said storing step, identifying one or more valid configurations of disk drives having a configuration file stored thereupon, and combining the valid configurations with the configuration established in the configuring step of the unconfigured disk drives into a full configuration, wherein a new logical drive order may be generated according to a set of combining rules.

7. The method of claim 1, after said configuring step and before said storing step, finding a partial configuration, converting the partial configuration into a valid configuration, and combining the valid configuration with the configuration established in the configure step of the unconfigured disk drives into a full configuration, wherein a new logical drive order may be generated according to a set of combining rules.

8. The method of claim 1, further comprising the step of:

presenting the full configuration including the identity of logical drives provided by the prepared configuration to a host operating system.

9. The method of claim 1, further comprising the steps of:

detecting the addition of one or more drives to the controller, and when the number of drives in an existing last logical drive plus the number of added drives is less than or equal to eight drives, associating the added drives with the existing last logical drive otherwise, when the added drives cannot be added to the existing last logical drive, forming one or more new independent logical drives with the added drives.

10. A computer-implemented method for automatically configuring disk drives connected to a RAID controller, the method comprising the steps of:

detecting, by the RAID controller, at runtime that at least one disk drive was added to the RAID controller;

determining, by the RAID controller, if one or more dead drives are connected to the RAID controller, and if there are one or more dead drives, substituting, by the controller, each dead drive with one of the added disk drives;

if there are no dead drives connected to the RAID controller, or if there are at least one of the added disk drives remaining, as a function of the number of added disk drives remaining and the number of disk drives in an existing last logical drive, adding, by the controller, the added drives to the existing last logical drive, and when the added disk drives cannot be added to the existing last logical drive, forming, by the controller, one or more new independent logical drives with the added drives based on a set of predetermined rules whereby a RAID level is established for the connected disk drives that may be different from the RAID level before the disk drives were added.

11. The method of claim 10, further comprising the steps of:

providing, by the controller, an existing configuration for existing disk drives connected to the RAID controller;

determining, by the controller, that the added disk drives are associated with an added configuration; and forming, by the controller, a new configuration from the existing configuration and the added configuration, wherein the new configuration may include new independent logical drives.

12. (Amended) The method of claim 11, wherein the existing configuration includes an existing logical drive order and wherein the added configuration includes an added logical drive order, further comprising a step of generating a new logical drive order for the new configuration using the existing configuration and the added configuration, wherein the new logical drive order is generated according to a set of combining rules.

13. A computer program product for use in conjunction with a computer system, the computer program product comprising a computer readable storage medium and a computer program mechanism embedded therein, the computer program mechanism, comprising:

a program module that directs a RAID controller connected to disk drives grouped into logical disk drives to function in a specified manner, the program module including:

a startup configuration procedure including instructions having a capability to generate a configuration for unconfigured disk drives, the unconfigured disk drive configuration including one or more logical disk drives, each logical disk drive configured in accordance with a particular RAID level, where the particular RAID level established for each logical disk drive after the generation of the configuration may be different from the RAID level before the generation of the configuration.

14. The computer program product of claim 13, wherein the startup configuration procedure includes instructions having a capability to configure each logical disk drive in accordance with a set of parameter settings associated with the logical disk drive and include: the number of unconfigured disk drives, redundancy needed, and redundancy method.

15. The computer program product of claim 13, wherein the startup configuration procedure including instructions having a capability to generate a full configuration from one or more valid configurations, one or more partial configurations, and one or more unconfigured disk drive configurations, wherein a new logical drive order may be generated according to a set of combining rules.

16. The computer program product of claim 13, further including:

a runtime configuration procedure including instructions having a capability to configure one or more disk drives added to the RAID controller during runtime whereby a RAID level is established for the connected disk drives that may be different from the RAID level before the disk drives were added.

17. The computer program product of claim 16, wherein the runtime configuration procedure including instructions having a capability to replace each dead drive with an added drive, and if there are no dead drives connected to the RAID controller, or if there are at least one of the added disk drives remaining, if the sum of the number of drives in an existing last logical drive and the number of the added drives is less than or equal to eight drives, adding, by the confroller, the added drives to the existing last logical drive, otherwise, forming, by the controller, one or more new independent logical drives with the added drives based on a set of predetermined rules.

18. A computer readable storage medium that directs a RAID controller connected to disk drives grouped into a plurality of logical drives to function in a specified manner, comprising:

a runtime configuration procedure including instructions having a capability to configure one or more disk drives added to the RAID controller during runtime, the instructions replacing each dead drive with an added drive and, as a function of the number of disk drives in a present configuration and the number of added drives, adding one or more of the added drives to one or more of the existing logical drives, or forming one or more new independent logical drives from the added drives.

19. The computer readable storage medium of claim 18, wherein each new independent logical drive is associated with a RAID level selected from the set consisting of RAID level 1, RAID level 5, and RAID level 0+1.

20. The computer readable storage medium of claim 18, wherein, the runtime configuration procedure includes instructions for the function that add one or more of the added drives starting from a last logical drive when the number of existing drives in the last logical drive plus the number of added drives is less than or equal to eight drives.

21. The computer readable storage medium of claim 18, further comprising:

a startup configuration procedure including instructions having a capability to generate a configuration for unconfigured disk drives, the unconfigured disk drive configuration including one or more logical disk drives, each logical disk drive configured in accordance with a particular RAID level, where the particular RAID level established for each logical disk drive after the generation of the configuration may be different from the RAID level before the generation of the configuration.

22. The method of claim 6, wherein the set of combining rules includes:

if there are two or more logical drives that conflict because they have a same logical drive number, (i) determining if a configuration label in the controller's configuration file matches a label associated with one of the two or more conflicting drives;

(ii) if there is such a matching label, associating the same logical drive number with the conflicting drive associated with the label; and, (iii) if there is not such a matching label, assigning the same logical drive number to the conflicting drive that has a SCSI channel identifier closest to a first SCSI channel and having a target identifier closest to a first SCSI device.

23. The method according to claim 10, wherein the set of predetermined rules specify a RAID configuration as a function of a number of added drives, whether redundancy is needed, redundancy method, and whether spares are needed.

24. In a data storage system, an apparatus for configuring connected disk drives, the disk drives being operatively connected to the apparatus, the apparatus comprising:

a memory storing a procedure and having data defined therein, said procedure having instructions for:

(a) identifying one or more unconfigured disk drives from among the connected disk drives; and, (b) preparing a configuration for the unconfigured disk drives in accordance with one of a plurality of RAID levels, including:

(i) associating with each unconfigured disk drive one or more parameter settings; and (Ii) configuring the unconfigured disk drives with a particular RAID level based on the number of unconfigured disk drives and the parameter settings, where the particular RAID level established for the unconfigured disk drives after the configuring may be different from the RAID level before the configuring of other of the connected disk drives.

25. The apparatus of claim 24, wherein the parameter settings are selected from a group consisting of: an indication of whether redundancy is needed, an indication of a redundancy method, and an indication of spare disk disposition.

26. The apparatus of claim 24, wherein the procedure includes instructions for preparing a configuration such that:

when only one unconfigured disk drive is found, configuring the unconfigured disk drive as a single drive (JBOD);

when the unconfigured disk drives are associated with a parameter setting indicating no redundancy, configuring the unconfigured disk drives in accordance with a RAID level 0;

when the unconfigured disk drives are associated with a parameter setting indicating mirroring, configuring the unconfigured disk drives in accordance with a RAID level of 0+1; and when the unconfigured disk drives are associated with a parameter setting indicating that mirroring is not required, configuring the unconfigured disk drives in accordance with RAID level of 5.

27. The apparatus of claim 24, wherein the procedure includes instructions to identify one or more valid configurations of disk drives having a configuration file stored thereupon, and combine the valid configurations with the configuration established in the configuring step of the unconfigured disk drives into a full configuration according to a set of combining rules.

28. The apparatus of claim 24, wherein the procedure includes instructions for finding memory is further adapted to find a partial configuration, convert the partial configuration into a valid configuration, and combine the valid configuration with the configuration of the unconfigured disk drives into a full configuration.

29. The apparatus of claim 24, wherein the procedure includes instructions for:

(a) detecting the addition of one or more disk drives to the data storage system; and, (b) if the number of drives in an existing last logical drive plus the number of added drives is less than or equal to eight drives, associating the added drives with the existing last logical drive; and, (c) otherwise, forming one or mofre new independent logical drives with the added drives.

30. The method of claim 12, wherein the set of combining rules includes:

if there are two or more logical drives that conflict because they have a same logical drive number, (i) determining if a configuration label in the controller's configuration file matches a label associated with one of the two or more conflicting drives;

(ii) if there is such a matching label, associating the same logical drive number with the conflicting drive associated with the label; and, (iii) if there is not such a matching label, assigning the same logical drive number to the conflicting drive that has a SCSI channel identifier closest to a first SCSI channel and having a target identifier closest to a first SCSI device.

31. The apparatus of claim 27, wherein the set of combining rules includes:

if there are two or more logical drives that conflict because they have a same logical drive number, (i) determining if a configuration label in the controller's configuration file matches a label associated with one of the two or more conflicting drives;

(ii) if there is such a matching label, associating the same logical drive number with the conflicting drive associated with the label; and, (iii) if there is not such a matching label, assigning the same logical drive number to the conflicting drive that has a SCSI channel identifier closest to a first SCSI channel and having a target identifier closest to a first SCSI device.

* * * * *

UNITED STATES PATENT AND TRADEMARK OFFICE
CERTIFICATE OF CORRECTION

PATENT NO. : 6,098,119
DATED : August 1, 2000
INVENTOR(S) : Surugucchi et al.

It is certified that error appears in the above-identified patent and that said Letters Patent is hereby corrected as shown below:

Col. 15, line 33:   delete "(Amended)"

Col. 18, line 24:   delete "mofre" and substitute therefor --more--.

Signed and Sealed this

Twenty-second Day of May, 2001

Attest:

NICHOLAS P. GODICI

Attesting Officer    Acting Director of the United States Patent and Trademark Office